United States Patent
Saito

(10) Patent No.: US 9,925,578 B2
(45) Date of Patent: Mar. 27, 2018

(54) METHOD FOR REDUCING SPRINGBACK AND APPARATUS FOR ANALYZING SPRINGBACK OF PRESS FORMED PARTS

(71) Applicant: JFE STEEL CORPORATION, Tokyo (JP)

(72) Inventor: Takanobu Saito, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 460 days.

(21) Appl. No.: 14/421,278

(22) PCT Filed: Aug. 28, 2013

(86) PCT No.: PCT/JP2013/073727
§ 371 (c)(1),
(2) Date: Feb. 12, 2015

(87) PCT Pub. No.: WO2014/034954
PCT Pub. Date: Mar. 6, 2014

(65) Prior Publication Data
US 2015/0217356 A1 Aug. 6, 2015

(30) Foreign Application Priority Data
Aug. 31, 2012 (JP) .................................. 2012-190914

(51) Int. Cl.
*G06F 17/50* (2006.01)
*B21D 22/02* (2006.01)
(Continued)

(52) U.S. Cl.
CPC ............. *B21D 22/02* (2013.01); *B21D 53/88* (2013.01); *B62D 65/00* (2013.01); *G06F 17/50* (2013.01);
(Continued)

(58) Field of Classification Search
CPC ........ B21D 22/02; B21D 53/88; B62D 65/00; G06F 17/50; G06F 17/5009;
(Continued)

(56) References Cited

U.S. PATENT DOCUMENTS 8,938,378 B2 * 1/2015 Suzuki .................. B21D 22/20
703/2
2004/0251711 A1 12/2004 Walther
(Continued)

FOREIGN PATENT DOCUMENTS

EP  2058062 A1  5/2009
EP  2 333 684 A1  6/2011
(Continued)

OTHER PUBLICATIONS

Oct. 22, 2016 Office Action issued in Korean Patent Application No. 10-2015-7006366.
(Continued)

*Primary Examiner* — Eunhee Kim
(74) *Attorney, Agent, or Firm* — Oliff PLC

(57) ABSTRACT

A method for reducing springback in a press-formed part according to the present invention includes an analytic model forming step including forming an analytic model of the part from plane elements and/or solid elements; a stressed-state setting step including setting each of the elements of the analytic model to a stressed state that causes a springback; a rigidity-contributable-portion detecting step including performing an optimization analysis for shape on the analytic model with the elements set to the stressed state in the stressed-state setting step to detect a portion of the part that highly contributes to the rigidity of the part; and a rigidity improving step including applying a rigidity improving means to the part on a basis of the portion detected in the rigidity-contributable-portion detecting step.

12 Claims, 30 Drawing Sheets

(51) Int. Cl.
  *B21D 53/88* (2006.01)
  *B62D 65/00* (2006.01)
(52) U.S. Cl.
  CPC ...... *G06F 17/5009* (2013.01); *G06F 17/5018* (2013.01); *G06F 2217/16* (2013.01); *G06F 2217/42* (2013.01); *Y02T 10/82* (2013.01)
(58) Field of Classification Search
  CPC ............. G06F 17/5018; G06F 2217/16; G06F 2217/42; Y02T 10/82; Y02T 10/82
  USPC ........................................................ 703/1, 6
  See application file for complete search history.

(56) References Cited

U.S. PATENT DOCUMENTS

| | | | |
|---|---|---|---|
| 2009/0295113 A1 | 12/2009 | Inoue et al. | |
| 2010/0005845 A1* | 1/2010 | Yoshida | G06F 17/5018 72/31.01 |
| 2011/0172803 A1* | 7/2011 | Suzuki | B21D 22/00 700/103 |
| 2011/0246150 A1* | 10/2011 | Miyagi | G06F 17/5018 703/2 |
| 2015/0217356 A1 | 8/2015 | Saito | |

FOREIGN PATENT DOCUMENTS

| | | |
|---|---|---|
| GB | 2467178 A | 7/2010 |
| JP | 2005-254279 A | 9/2005 |
| JP | 2006-035245 A | 2/2006 |
| JP | 2006-315063 A | 11/2006 |
| JP | 2007-229724 A | 9/2007 |
| JP | 2008-000778 A | 1/2008 |
| JP | 2008-040528 A | 2/2008 |
| JP | 2011-107758 A | 6/2011 |
| KR | 2010-0109820 A | 10/2010 |

OTHER PUBLICATIONS

Nov. 19, 2013 International Search Report issued in International Patent Application No. PCT/JP2013/073727.

Yuji Umehara, "Technologies for the more precise press-forming of automobile parts", Journal of Materials Processing Technology, vol. 22, No. 3, Sep. 1, 1990, pp. 239-256.

Tohru Yoshida et al, "Nippon Steel Technical Report Shape Control Techniques for High Strength Steel in Sheet Metal Forming", Nippon Steel Technical Report No. 88, Jul. 1, 2003, pp. 27-32.

Yilamu, K. et al, "Air bending and springback of stainless steel clad aluminum sheet", Journal of Materials Processing Technology, Elsevier, NL, vol. 210, No. 2, Jan. 19, 2010, pp. 272-278.

Dec. 18, 2015 Supplementary European Search Report in European Patent Application No. 13832542.8.

G. Durrant, et al. "Squeeze cast aluminum reinforced with mild steel inserts", Journal of Materials Science, vol. 31, pp. 589-602, 1996.

Dec. 26, 2017 Office Action issued in U.S. Appl. No. 14/421,255.

* cited by examiner

FIG. 3
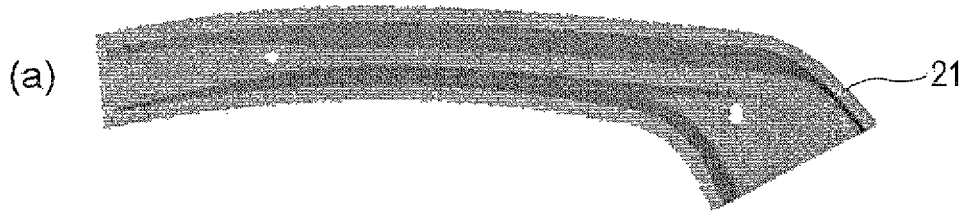
(a)
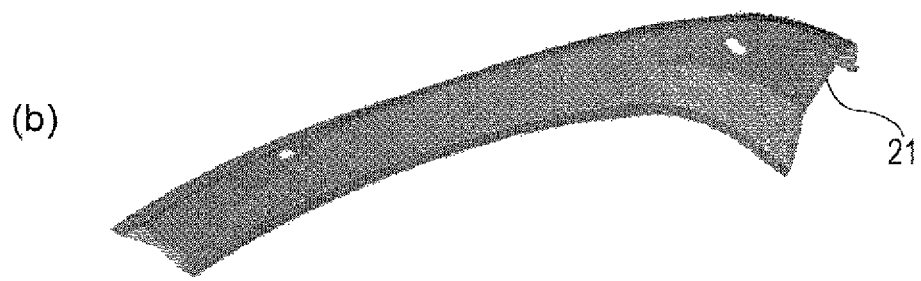
(b)

FIG. 4
(a) 
(b) 
(c) 

FIG. 29
(a) 
(b) 

METHOD FOR REDUCING SPRINGBACK AND APPARATUS FOR ANALYZING SPRINGBACK OF PRESS FORMED PARTS

TECHNICAL FIELD

The present invention relates to a method for reducing springback in a press-formed part and an apparatus for analyzing with which springback that occurs in a press-formed part, such as an automobile part, can be effectively reduced.

BACKGROUND ART

In consideration of environmental problems in the automotive industry, in particular, weight reduction of automotive bodies has progressed in recent years, which requires metal sheet materials used for automotive bodies to have smaller thickness while having high strength and rigidity. In view of these requirements, high-strength steel sheets have gradually been adopted as a metal material.

When, however, a high-strength steel sheet is used, a phenomenon, specifically, a large amount of springback occurs in the steel sheet during forming. If a large amount of springback occurs in a sheet, the sheet is described as having a defective shape and fails to be assembled by joining or by other methods. Thus, a springback reduction method is an extremely important technology and various different methods have been developed.

Patent Literature 1 is taken as an example of the springback reduction method. Patent Literature 1 discloses a die for press forming with which a metal material is processed so as to have a hat-shaped cross section without deep drawing and a compressive force is applied to a vertical wall portion of the metal sheet material immediately after the bending step is finished.

In addition, a method for analyzing a cause of springback before performing the springback reduction method is disclosed in, for example, Patent Literature 2. Patent Literature 2 discloses an analysis method for press forming with which a portion of a press-formed part that highly contributes to springback is accurately calculated in a short period of time. As specific measures against springback, Patent Literature 2 describes optimization of press forming conditions such as the shape of a die of press forming, the shape of a blank, or the way how a drawbead is inserted ([0031] of Patent Literature 2).

CITATION LIST

Patent Literature

[PTL 1] Japanese Unexamined Patent Application. Publication No. 2005-254279
[PTL 2] Japanese Unexamined Patent Application Publication No. 2007-229724

SUMMARY OF INVENTION

Technical Problem

As described in Patent Literature 1, in the case of reducing springback by using a die of press forming, the shape of a press-formed part for which the measure is expected to be effective is limited to an extremely narrow range of shapes. The cost is also high since a special die for press forming is manufactured.

As in the case of Patent Literature 2, it is useful to analyze the cause of springback. However, the efficacy of the measure based on the result of the cause analysis is uncertain.

As described above, the known springback reduction technologies are insufficient under the present circumstances and thus more effective measures against springback have been desired.

The present invention has been accomplished to solve the above problem and an object of the present invention is to provide a technology that enables further reliable reduction of the springback.

Solution to Problem

As described in Patent Literature 2, for example, in the known springback reduction method, cause analysis and the measure have been separately considered such that a cause is analyzed and the measure is taken against the cause.

Thus, even if the cause is appropriately analyzed, it is difficult to directly connect the measure against the cause to the cause. Thus, effective springback reduction cannot be expected.

On the basis of the known idea of analyzing a cause and taking measures against the cause, the inventors have conceived an idea of integrally considering the cause analysis and the measure.

Firstly, the inventors have focused his attention to the fact that, if a part has high rigidity, springback can be reduced in the part even when a force that can cause springback occurs due to residual stress that is generated during a press forming. The inventors have thus come up with an idea of reducing springback by improving the rigidity of the part.

Typically, it is possible to improve the rigidity of a part by forming a portion of the part into, for example, a protruding shape.

The important issue in relation to the springback reduction, however, is which portion of the part should be shaped and into what kind of shape. Here, the cause of springback cannot be ignored.

To this end, the inventors set a part, which is a target of the springback reduction, into a stressed state that causes springback and calculated which portion of the part requires how much rigidity under the stressed state. Consequently, the inventors found that a direct and effective measure can be taken against the cause of springback.

The present invention is made on the basis of this finding and specific configurations are as follows.

(1) A method for reducing a springback of a press-formed part according to the present invention provides a method for reducing springback that occurs in a part formed by press forming a metal sheet. The method includes an analytic model forming step for forming an analytic model of the part with plane elements and/or solid elements; a stressed-state setting step for setting each of the elements of the analytic model to a stressed state that causes a springback; a rigidity-contributable-portion detecting step for performing an optimization analysis for shape on the analytic model with the elements set to the stressed state to detect a portion of the part that highly contributes to the rigidity thereof; and a rigidity improving step for applying a rigidity improving means to the part on a basis of the portion detected in the rigidity-contributable-portion detecting step.

(2) In the method for reducing the springback according to (1), the stressed-state setting step constrains a first portion of the analytic model and applies a bending load and/or a torsional load to a second portion of the analytic model to generate stress in the analytic model so that each of the elements of the analytic model is set to the stressed state.

(3) In the method for reducing springback according to (2), the stressed-state setting step sets a springback evaluation point as a constraint point at which the analytic model is constrained.

(4) In the method for reducing springback according to (2) or (3), the stressed-state setting step sets a direction in which the springback occurs in a part formed in advance as a direction in which the bending load and/or the torsional load is applied to the second portion of the analytic model.

(5) In the method for reducing springback according to (1), the stressed-state setting step performs a forming analysis on the analytic model to determine residual stress generated in the part before a separation from a die and sets the determined residual stress to each of the elements of the analytic model.

(6) In the method for reducing springback according to any one of (1) to (5), the rigidity improving-means performs, on the basis of the portion of the part detected in the rigidity-contributable-portion detecting step, one or more of increasing a thickness; increasing a Young's modulus; bonding another sheet; and forming a protruding shape and/or a recessed shape.

(7) A springback-reduction analyzing apparatus for a press-formed part according to the present invention provides a springback-reduction analyzing apparatus that reduces a springback that occurs in a part formed by press forming a metal sheet. The apparatus includes: an analytic model forming means for forming an analytic model of the part with plane elements and/or solid elements; a stressed-state setting means for setting each of the elements of the analytic model to a stressed state that causes the springback; a rigidity-contributable-portion detecting means for performing an optimization analysis for shape on the analytic model with the elements set in the stressed state to detect a portion of the part that highly contributes to the rigidity thereof; and a rigidity improving means for applying rigidity improving means to the part on a basis of the portion detected by the rigidity-contributable-portion detecting means.

(8) In the analyzing apparatus according to (7), the stressed-state setting means constrains a first portion of the analytic model and applies a bending load and/or a torsional load to a second portion of the analytic model to generate stress in the analytic model so that each of the elements of the analytic model is set to the stressed state.

(9) In the analyzing apparatus according to (8), the stressed-state setting means sets a springback evaluation point as a constraint point at which the analytic model is constrained.

(10) In the analyzing apparatus according to (8) or (9), the stressed-state setting means sets a direction in which the springback occurs in a part formed in advance as a direction in which the bending load and/or the torsional load is applied to the second portion of the analytic model.

(11) In the analyzing apparatus according to (7), the stressed-state setting means performs a forming analysis on the analytic model to determine residual stress generated in the part before a separation from a die and sets the determined residual stress to each of the elements of the analytic model.

(12) In the analyzing apparatus according to any one of (7) to (11), the rigidity improving means performs, on the basis of the portion of the analytic model detected in the rigidity-contributable-portion detecting step, one or more of increasing a thickness; increasing a Young's modulus; bonding another sheet; and forming a protruding shape and/or a recessed shape.

Advantageous Effects of Invention

The method according to the present invention includes an analytic model forming step for forming an analytic model of the part with plane elements and/or solid elements; a stressed-state setting step for setting each of the elements of the analytic model thus formed to a stressed state that causes a springback; a rigidity-contributable-portion detecting step for performing an optimization analysis for shape on the analytic model with the elements set to the stressed state in the stressed-state setting step to detect a portion that highly contributes to the rigidity; and a rigidity improving step for performing a rigidity improvement on the part on a basis of the portion detected in the rigidity-contributable-portion detecting step. Thus, a direct and effective measure can be taken against the cause of springback.

Moreover, in the case where a part on which the springback reduction method is to be performed is an automotive part, improvement in the rigidity of the part is also effective for improving the rigidity of the vehicle body.

BRIEF DESCRIPTION OF DRAWINGS

FIG. 3 is a diagram illustrating a part that is to be formed with the method for reducing springback illustrated in FIG. 1.

FIG. 4 is a diagram illustrating examples of how elements are used in the method for reducing springback illustrated in FIG. 1.

FIG. 29 is a diagram illustrating comparative examples for confirming the effect of the springback reduction method according to Example 2 of the present invention.

DESCRIPTION OF EMBODIMENT

As illustrated in the flow chart of FIG. 1, a method for reducing springback in a press-formed part according to an embodiment of the present invention (hereinafter simply referred to as "springback reduction method") includes an analytic model forming step S1 for forming an analytic model of the part with plane elements and/or solid elements; a stressed-state setting step S3 for setting each of the elements of the analytic model thus formed to a stressed state that causes a springback; a rigidity-contributable-portion detecting step S5 for performing an optimization analysis for shape on the analytic model with the elements set to the stressed state in the stressed-state setting step S3 to detect a portion that highly contributes to the rigidity; and a rigidity improving step S7 for performing a rigidity improvement on the part on a basis of the portion detected in the rigidity-contributable-portion detecting step S5. The method will be described in detail below.

The method for reducing springback according to the present invention is performed with a device such as a personal computer (PC) that executes program processing or the like. The configuration of the apparatus (hereinafter referred to as "springback reducing apparatus 1") is roughly described with reference to the block diagram of FIG. 2.

[Springback Reducing Apparatus]

Figure 2:
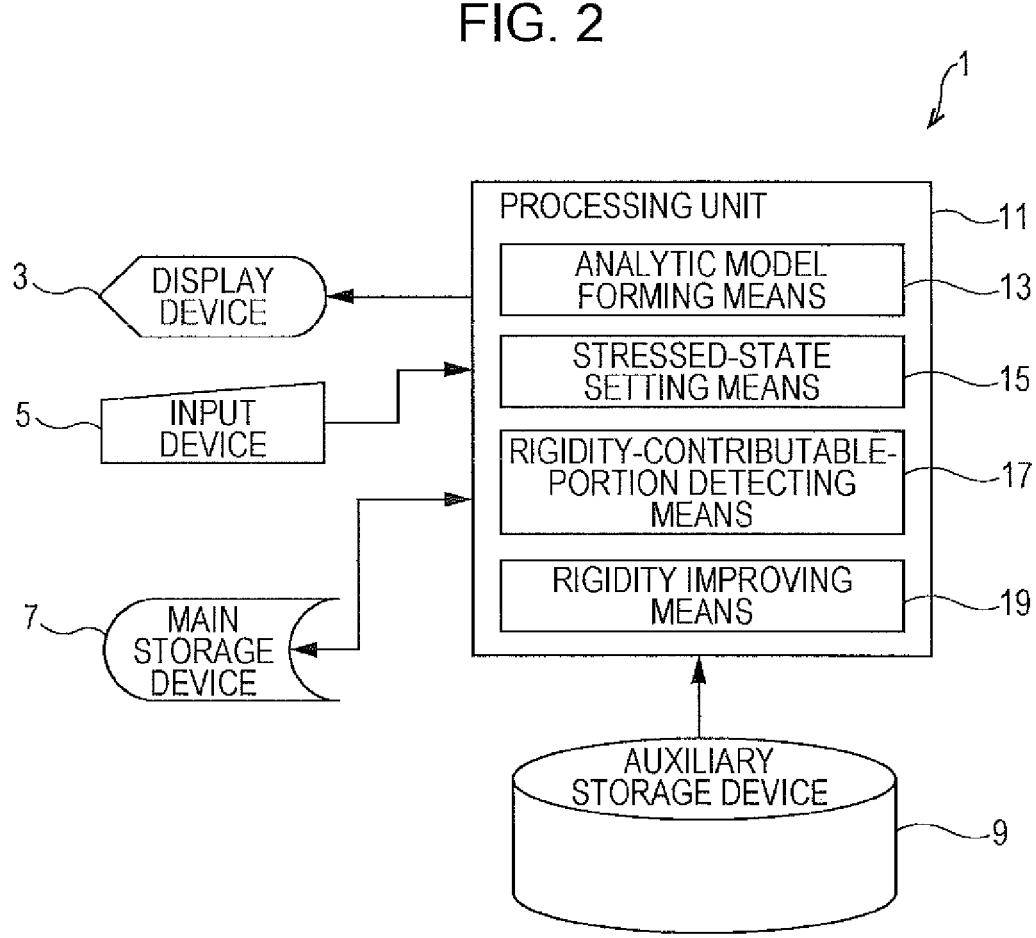
FIG. 2 is a diagram illustrating an analyzing apparatus used for the method for reducing springback illustrated in FIG. 1.

A springback reducing apparatus 1 according to an embodiment is, for example, a PC and includes a display device 3, an input device 5, a main storage device 7, an auxiliary storage device 9, and a processing unit 11, as illustrated in FIG. 2.

The display device 3, the input device 5, the main storage device 7, and the auxiliary storage device 9 are connected to the processing unit 11 and operate according to commands of the processing unit 11. The display device 3 is used for displaying calculation results or for other purposes and is, for example, a liquid crystal monitor. The input device 5 is used when, for example, an operator inputs information. The input device 5 includes a keyboard and a mouse. The main storage device 7 is used for temporarily storing data used by the processing unit 11, for calculations, and for other purposes. The main storage device 7 is, for example, a random-access memory (RAM). The auxiliary storage device 9 is used for storing data or for other purposes and is, for example, a hard disk.

The processing unit 11 is, for example, a central processing unit (CPU) of a PC or other devices. The processing unit 11 includes an analytic model forming means 13, a stressed-state setting means 15, a rigidity-contributable-portion detecting means 17, and a rigidity improving means 19. These means are implemented when the CPU or another device executes predetermined programs. These means will be described below.

<Analytic Model Forming Means>

The analytic model forming means 13 forms an analytic model of a part with plane elements (shell element), solid elements, or both plane elements and solid elements. FIG. 4 illustrates examples of a method for using plane elements and solid elements. FIG. 4 illustrates analytic models formed for a flat-surface shape. FIG. 4(a) is an analytic model formed with only plane elements. FIG. 4(b) is an analytic model formed with only solid elements. FIG. 4(c) is an analytic model formed with both plane elements and solid elements such that the solid elements are disposed on the top surfaces of the plane elements.

When the optimization analysis for shape (to be described in detail, below) is performed on the analytic models formed by using the methods illustrated in FIG. 4(a) and FIG. 4(b), no elements are left in portions of the resultant model where unneeded elements are eliminated. When the optimization analysis for shape is performed on the analytic model formed by using the method illustrated in FIG. 4(c), only the solid elements on the top surface of the plane element are eliminated.

Here, any of the methods of using the element may be employed in the present invention.

<Stressed-State Setting Means>

The stressed-state setting means 15 sets each element of the analytic model formed by the analytic model forming means 13 to a stressed state that causes a springback.

As an example of a method for setting the element to the stressed state, while a part of the analytic model is constrained, various types of loads are applied to another part of the analytic model, such as a bending load, a torsional load, or both a bending load and a torsional load. The analytic model is thus brought into the stressed state and each element of the analytic model is set to the stressed state. An alternative method for setting each element to the stressed state is to directly transfer (map) a separately produced stressed state to each element. The separately produced stressed state may be, for example, bottom-dead-centre state (in the state before being separated from the die) produced by a press forming analysis. Each element may be manually set to the stressed state as appropriate.

<Rigidity-Contributable-Portion Detecting Means>

The rigidity-contributable-portion detecting means 17 performs an optimization analysis for shape on the analytic model set to the stressed state by the stressed-state setting means 15 to detect a portion that highly contributes to the rigidity.

For example, a topology optimization analysis is employed as the optimization analysis for shape. The topology optimization analysis is an analytic method that includes analyzing an analytic model of a target part to leave minimum elements required for satisfying given analytic conditions (stressed state, loads, constraints, volume percentage, and the like) and determining a portion including only the minimum elements as an optimal portion. Assume if the analytic conditions are set, for example, to find "a portion that most highly contributes to the rigidity under specific load constraint conditions and whose volume percentage of the entire portion is 20% of the initial shape". Then, elements of the analytic model that are not required to satisfy the analytic conditions are eliminated until the volume percentage of the remaining portion becomes 20% of the initial state. Finally, a portion including only the minimum elements is left. Specifically, for example, the amount of deformation is studied assuming that each element included in the analytic model is eliminated. Then, elements are eliminated in ascending order of a change in the amount of deformation before and after the elimination. This operation is performed until the volume percentage of the remaining portion becomes 20% of the initial state. This remaining portion is a portion that highly contributes to the rigidity (rigidity contributable portion).

Besides the topology optimization analysis, the optimization analysis for shape may be an optimization analysis such as a topography optimization analysis or a numerical optimization analysis.

<Rigidity Improving Means>

On the basis of the portion detected by the rigidity-contributable-portion detecting means 17, a method for improving the rigidity of a part is performed.

The rigidity contributable portion is a portion that highly contributes to a rigidity under a load condition assuming a springback. Thus, by increasing the strength of the rigidity contributable portion in the analytic model, the springback can be reduced. Accordingly, the rigidity improving means 19 performs a rigidity improvement method on an analytic model on the basis of the rigidity contributable portion detected by the rigidity-contributable-portion detecting means 17.

Specific examples of the rigidity improving method are, on the basis of the rigidity contributable portion of an analytic model detected in the rigidity-contributable-portion detecting step S5, increasing a thickness of the rigidity contributable portion, increasing a Young's modulus of the rigidity contributable portion, bonding another sheet to the rigidity contributable portion for reinforcement, and forming the rigidity contributable portion into a protruding shape and/or a recessed shape similar to the shape of the outline of the rigidity contributable portion. Either one of the above examples or appropriately selected ones of the above examples may be performed.

The outline shape of the rigidity contributable portion may be used as it is for forming a portion into the protruding shape and/or the recessed shape. If the outline shape is too complex to be used as it is, a rough shape of the outline shape may be used, instead. Consequently, the rigidity of the portion shaped into a protruding shape and/or a recessed shape can be improved. If the rigidity contributable portion extends to a wide range, a waveform bead that extends in the load direction may be additionally provided within the outline shape of the rigidity contributable portion when a portion of a blank sheet is shaped into a protruding shape and/or a recessed shape.

[Method for Reducing Springback]

Figure 1:
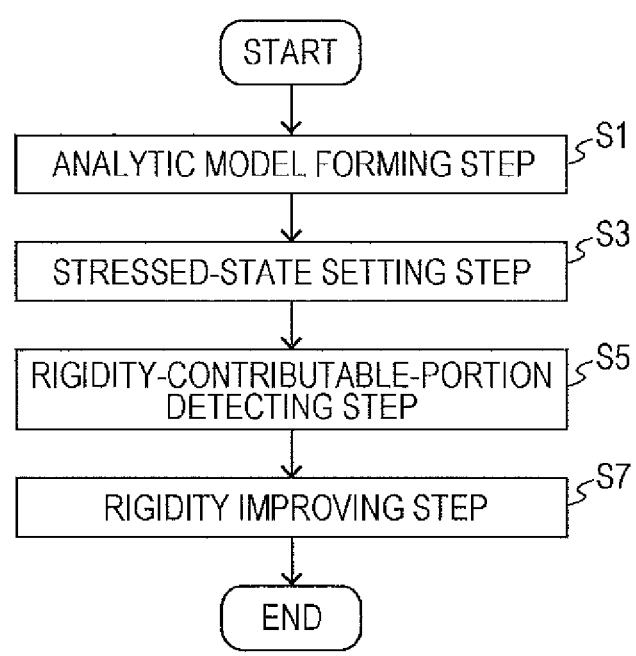
FIG. 1 is a flow chart illustrating a process of a method for reducing springback according to a first embodiment of the present invention.

Referring now to the flow chart illustrated in FIG. 1 and appropriate drawings as needed, the processing flow of the method for reducing springback using the springback reducing apparatus 1 is described.

Here, a case where the springback reduction method is performed on an A pillar 21 illustrated in FIG. 3, which is taken as an example of a part to be analyzed, is described below. FIG. 3(*a*) is a plan view of the A pillar 21 and FIG. 3(*b*) is a perspective view of the A pillar 21. As illustrated in FIG. 3, the A pillar 21 has a hat-shaped cross section.

Primary types of deformations that can occur due to springback are a bending deformation and a torsional deformation. Thus, in this embodiment, three types of springback, that is, a springback against a bending deformation, a springback against a torsional deformation, and a springback against a bending-torsional-combined deformation, are assumed as examples of the springback. Accordingly, with the method for reducing springback according to the embodiment, three types of springback reduction, reduction of a springback against the bending deformation, reduction of a springback against the torsional deformation, and reduction of a springback against the bending-torsional-combined deformation are analyzed.

Referring now to FIG. 1 to FIG. 11, each step (the stressed-state setting step S3, the rigidity-contributable-portion detecting step S5, and the rigidity improving step S7) of the method for reducing springback will be described in detail below.

<Analytic Model Forming Step>

Firstly, in the analytic model forming step, the analytic model forming means 13 forms an analytic model 23 of the A pillar 21 (FIG. 5), which is a part to be analyzed. In this embodiment, for example, nine types of analytic models 23 are formed in total in accordance with the assumed springback types and in accordance with the three types of use of elements described with reference to FIG. 4 for each springback type.

<Stressed-State Setting Step>

Subsequently, in the stressed-state setting step S3, the stressed-state setting means 15 sets each element of the analytic models 23 thus formed to the stressed state.

An example of the method for setting the element to the stressed state includes, while constraining a portion of the analytic model. 23, applying a bending load and/or a torsional load to another portion to the analytic model 23 so that each element of the analytic model 23 is brought into the stressed state. This method for setting each element of the analytic model 23 to the stressed state is described as an example.

Figure 5:
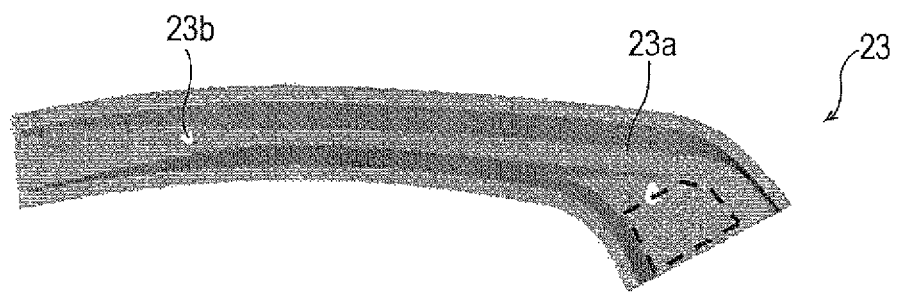
FIG. 5 is a diagram illustrating a stressed-state setting step in the method for reducing springback illustrated in FIG. 1 (part 1).
Figure 6:
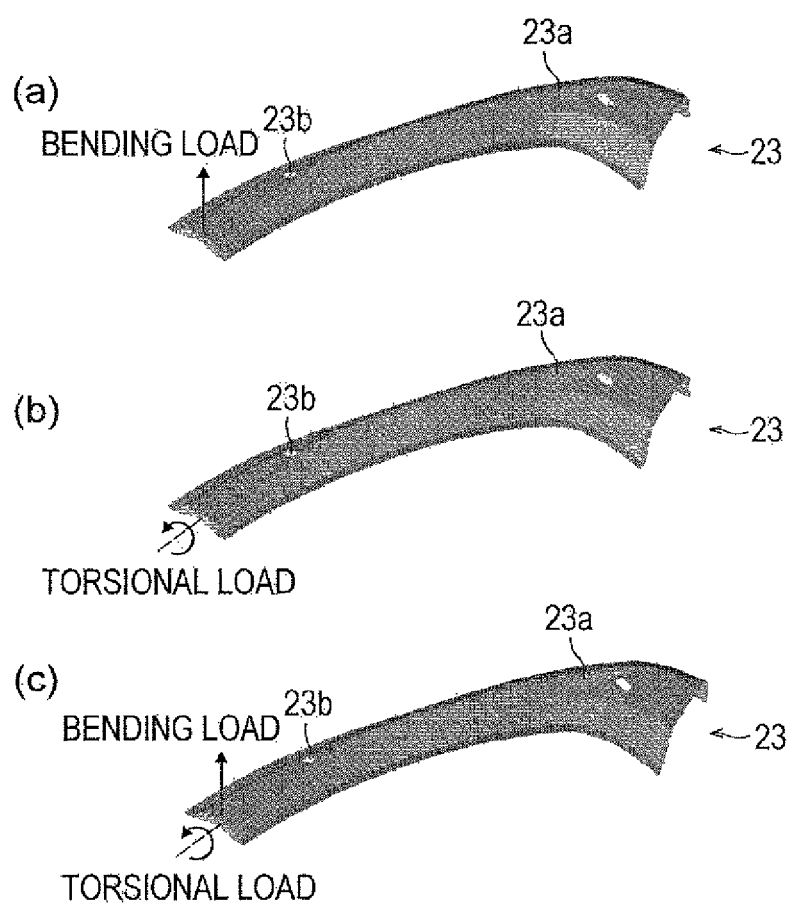
FIG. 6 is a diagram illustrating the stressed-state setting step in the method for reducing springback illustrated in FIG. 1 (part 2).

Regarding the constraint conditions, an upper surface of an end portion (an area surrounded by a dotted line in FIG. 5) is constrained in all the analytic models 23 as illustrated in FIG. 5.

The load conditions are set in the following manner. When parts are press formed, a specific type of springback occurs in a specific direction in respective parts. Thus, each part is subjected to a press-forming analysis in advance to find what type of springback occurs and the load condition is set on the basis of the direction of the springback thus found to occur. In this embodiment, the load conditions are set in the following manner. In the case of the bending deformation, as illustrated in FIG. 6(a), a bending load is applied to the analytic models 23 such that an end portion opposite the constrained end portion is bent upward. In the case of the torsional deformation, as illustrated in FIG. 6(b), a torsional load is applied to the analytic models 23 such that the end portion opposite the constrained end portion is twisted around the longitudinal direction of the A pillar 21. In the case of the bending-torsional-combined deformation, as illustrated in FIG. 6(c), both loads of FIG. 6(a) and FIG. 6(b) are applied to the analytic models 23 in combination.

The above-described examples are simple examples made assuming a bending deformation, a torsional deformation, and a bending-torsional-combined deformation as causes of springback. Alternatively, analyses can be performed assuming a deformation due to an actual springback.

In the above load conditions, a bending load, a torsional load, and a bending-torsional-combined load are applied. It is also possible to perform a press-forming analysis and set boundary conditions to the elements by mapping the distribution of the stress at the bottom dead center state produced by the press-forming analysis to the elements that constitute the shape of the part. Alternatively, it is also possible to use the above-described analytic conditions (constrains and loads) in combination.

<Rigidity-Contributable-Portion Detecting Step>

Subsequently, in the rigidity-contributable-portion detecting step S5, an optimization analysis for shape is performed on each analytic model 23 set to the stressed state in the stressed-state setting step S3 so that the rigidity contributable portion is detected. In this embodiment, the volume percentage that is to be left is set to 20% of the initial shape.

Figure 7:
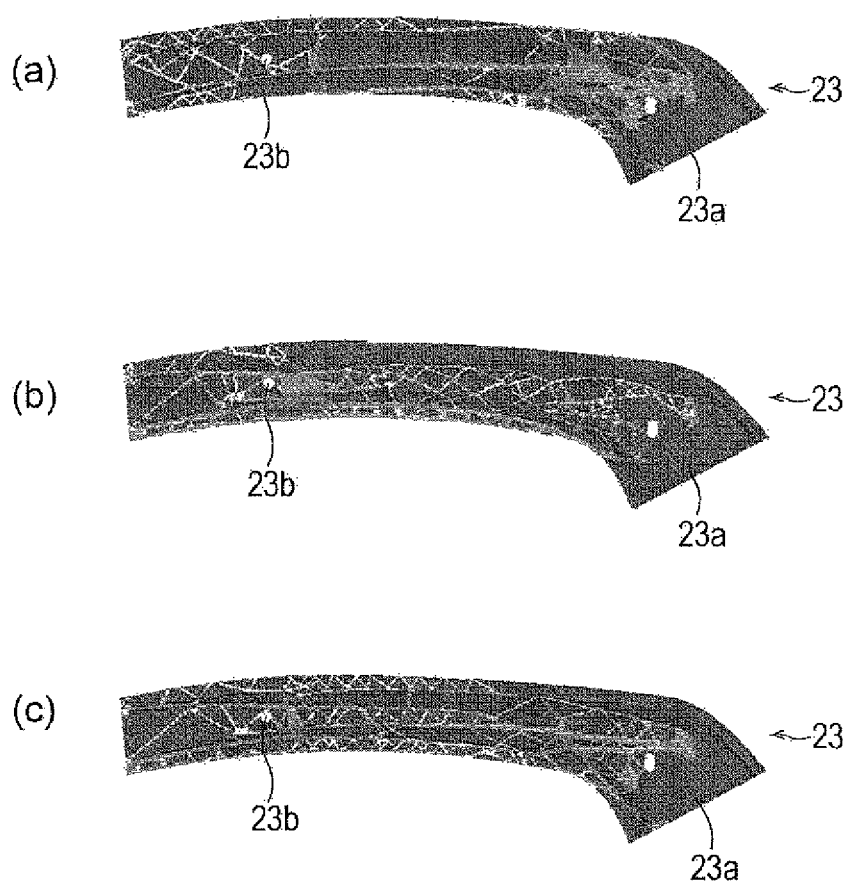
FIG. 7 is a diagram illustrating results obtained after the rigidity-contributable-portion detecting step in the method for reducing springback illustrated in FIG. 1 is performed (part 1).
Figure 8:
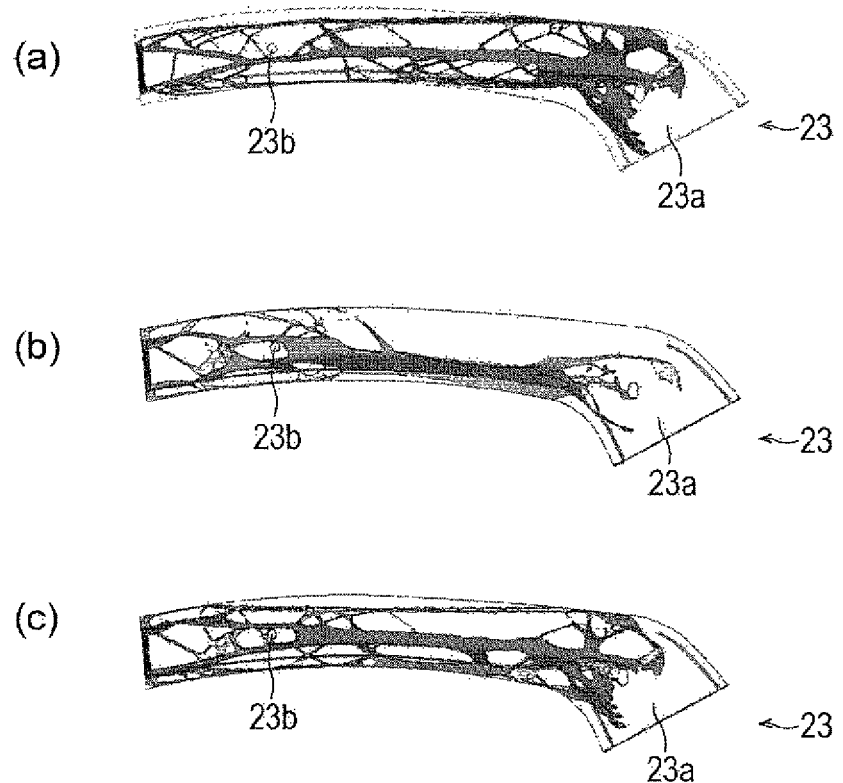
FIG. 8 is a diagram illustrating results obtained after the rigidity-contributable-portion detecting step in the method for reducing springback illustrated in FIG. 1 is performed (part 2).
Figure 9:
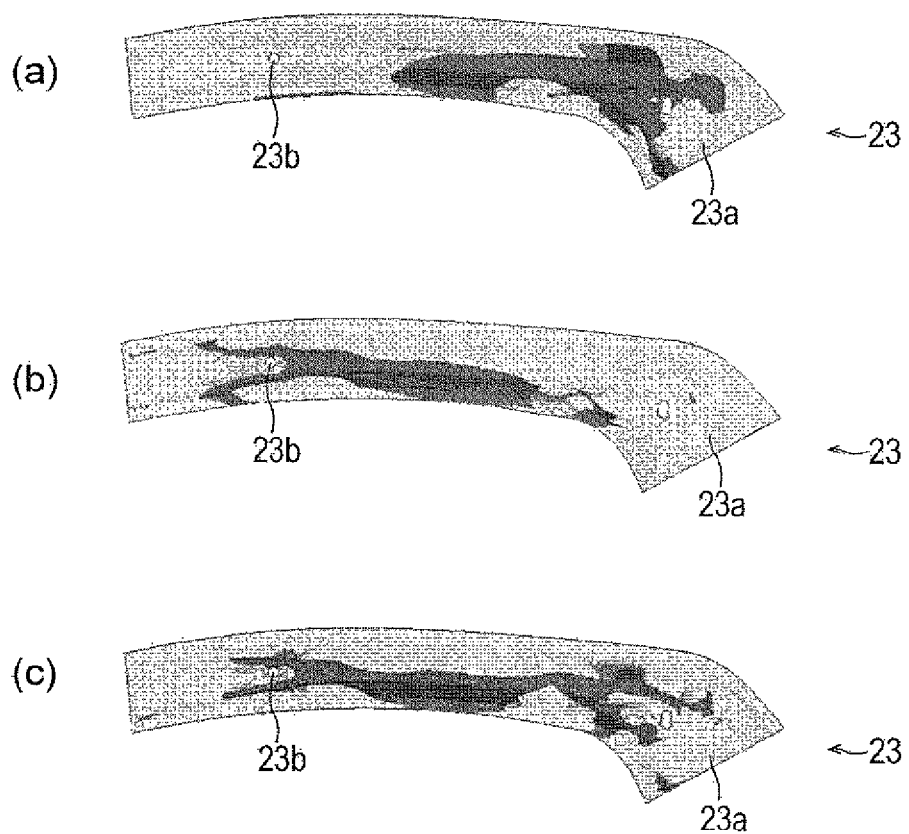
FIG. 9 is a diagram illustrating results obtained after the rigidity-contributable-portion detecting step in the method for reducing springback illustrated in FIG. 1 is performed (part 3).

FIG. 7 to FIG. 9 illustrate results of an optimization analysis for shape.

FIG. 7 illustrates results obtained after analyzing the analytic models 23 formed with plane elements alone. FIG. 7(a) illustrates a result of an optimization analysis for shape against the bending deformation (bending load), FIG. 7(b) illustrates a result of an optimization analysis for shape against the torsional deformation (torsional load), and FIG. 7(c) illustrates a result of an optimization analysis for shape against the bending-torsional-combined deformation (bending-torsional-combined load). Elements that remain as the results of optimization analyses (rigidity contributable portions) are marked with thin grey.

As illustrated in FIG. 7, the remaining portions (rigidity contributable portions) are reticulated under all the load conditions. FIG. 7(a) shows that a large part is left near the constrained portion described with reference to FIG. 5. In FIG. 7(b), a large part is left near a punched hole 23b. In FIG. 7(c), the rigidity contributable portion extends more widely than those in the cases illustrated in FIG. 7(a) and FIG. 7(b).

FIG. 8 illustrates results obtained by analyzing the analytic models 23 formed with solid elements alone. As in the case of FIG. 7, FIG. 8(a) illustrates a result of an optimization analysis for shape against the bending deformation (bending load), FIG. 8(b) illustrates a result of an optimization analysis for shape against the torsional deformation (torsional load), and FIG. 8(c) illustrates a result of an optimization analysis for shape against the bending-torsional-combined deformation (bending-torsional-combined load). In FIG. 8, the rigidity contributable portions are marked with thick grey.

FIG. 9 illustrates results obtained by analyzing the analytic models 23 formed with both plane elements and solid elements. As in the cases illustrated in FIG. 7 and FIG. 8, FIG. 9(a) illustrates a result of an optimization analysis for shape against the bending deformation (bending load), FIG. 9(b) illustrates a result of an optimization analysis for shape against the torsional deformation (torsional load), and FIG. 9(c) illustrates a result of an optimization analysis for shape against the bending-torsional-combined deformation (bending-torsional-combined load). In FIG. 9, portions marked with thin grey indicate portions including only the plane element and portions marked with thick grey indicate rigidity contributable portions. The rigidity contributable portions are portions in which solid elements remain on the top surface of the plane element.

FIG. 9 shows that the rigidity contributable portions remain without being reticulated, as compared with the cases illustrated in FIG. 7 and FIG. 8.

<Rigidity Improving Step>

Figure 10:
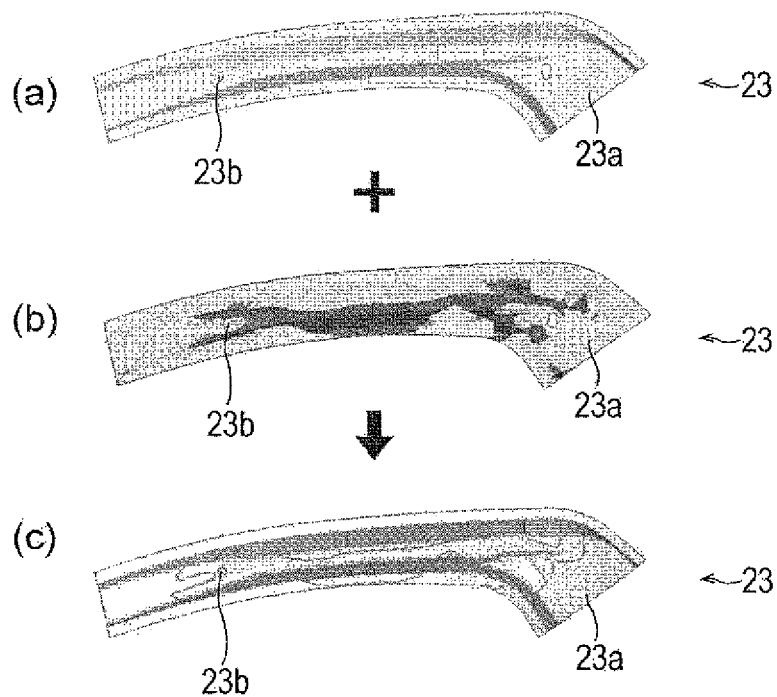
FIG. 10 is a diagram illustrating a rigidity improving step in the method for reducing springback illustrated in FIG. 1.

Subsequently, in the rigidity improving step S7, a rigidity improving means is applied to the A pillar 21 on the basis of the rigidity contributable portion detected by the rigidity improving means 19 in the rigidity-contributable-portion detecting step S5. As an example of the rigidity improving means, in relation to the analytic model 23, the thickness of the rigidity contributable portion is made two times that of the initial A pillar 21 (see FIG. 10(a)) as illustrated in FIG. 10, in this embodiment, on the basis of the rigidity contributable portion (see FIG. 10(b), which is the same as illustration of FIG. 9(c)) detected in the rigidity-contributable-portion detecting step S5 (see FIG. 10(c)).

In order to confirm the effect of the embodiment, a springback analysis was performed to analyze a springback that causes a bending-torsional-combined deformation by applying a bending-torsional-combined load to the analytic model 23 (Comparative Example 1) on which the rigidity improvement method illustrated in FIG. 10(a) is not performed and to the analytic model 23 (Invention Example 1) on which the rigidity improvement method illustrated in FIG. 10(c) has been performed.

Table 1 shows maximum displacement differences (mm, a difference between the maximum displacement and the minimum displacement) in the z direction as the results of analysis. Table 1 also shows the result of analysis similarly performed on Comparative Example 2, in which the thickness of a ceiling portion 23a corresponding to the analytic model 23 is doubled in accordance with a human intuition (see FIG. 11).

TABLE 1

|  | Invention Example 1 | Comparative Example 1 | Comparative Example 2 |
|---|---|---|---|
| Maximum Displacement Amount (mm) | 8.2 | 17.4 | 10.6 |

Figure 11:
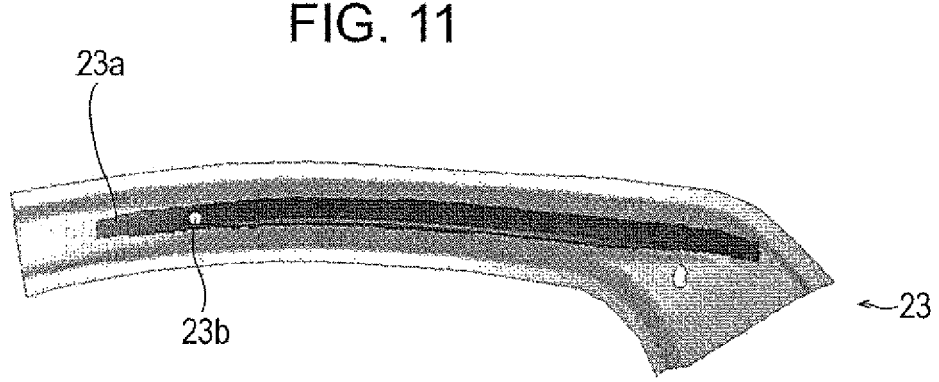
FIG. 11 is a diagram illustrating a comparative example used for confirming the effect of the method for reducing springback illustrated in FIG. 1.

As shown in Table 1, the maximum displacement difference in the Z direction before and after occurrence of springback is 17.4 mm in Comparative Example 1 (before performing the rigidity improvement method, see FIG. 10(a)), 8.2 mm in Invention Example 1 (after performing the rigidity improvement method, see FIG. 10(c)), and 10.6 mm in Comparative Example 2 (see FIG. 11). The amount of torsion is reduced in both Invention Example 1 and Comparative Example 2 on which methods have been performed, but the amount of torsion is reduced to a larger degree in Invention Example 1.

When a flexural rigidity analyses were performed on Comparative Example 1 and on Invention Example 1, the flexural rigidity of Invention Example 1 was improved by 17.3% with respect to Comparative Example 1. Similarly, when a torsional rigidity analyses were performed on Comparative Example 1 and on Invention Example 1, the torsional rigidity of Invention Example 1 was improved by 7.8% with respect to Comparative Example 1.

As described above, this embodiment includes the analytic model forming step S1 for forming an analytic model 23 of the A pillar 21 serving as a part with plane elements and/or solid elements, the stressed-state setting step S3 for setting each of the elements of the analytic model 23 thus formed to a stressed state that causes a springback, the rigidity-contributable-portion detecting step S5 for performing an optimization analysis for shape on the analytic model 23 with the elements set to the stressed state in the stressed-state setting step S3 to detect a portion that highly contributes to the rigidity, and the rigidity improving step S7 for performing a method for improving the rigidity of the A pillar 21 on a basis of the portion detected in the rigidity-contributable-portion detecting step S5. In this manner, the rigidity contributable portion of the analytic model 23 can be detected and the rigidity of the A pillar 21 can be improved on the basis of the detected rigidity contributable portion. Consequently, the springback can be reduced. In addition, an increase in the rigidity of each part brings about a side effect of improving the rigidity of the vehicle body.

In the above description, a method that makes the thickness of the rigidity contributable portion two times the blank sheet has been proposed. An specific example of the method is as follows. If the analytic model 23 is subjected to an analysis of reverse press forming back to a flat sheet (blank sheet), a rigidity contributable portion in the blank sheet corresponding to the rigidity contributable portion of the analytic model 23 is found. By improving the rigidity of the rigidity contributable portion of the blank sheet thus found, the rigidity of the rigidity contributable portion of the press-formed part formed by press forming can be improved. The rigidity contributable portion of the blank sheet whose rigidity is to be improved may be a portion that directly corresponds to the rigidity contributable portion of the press-formed part obtained after the press forming. If the rigidity contributable portion of the blank sheet is too complex as it is, a portion that corresponds to a rough shape of the rigidity contributable portion of the press-formed part may be formed as a rigidity contributable portion of the blank sheet.

Examples of the method for improving the rigidity of the rigidity contributable portion of the blank sheet includes a method of increasing the thickness of the rigidity contributable portion, a method of increasing the Young's modulus of the rigidity contributable portion, and a method of bonding another sheet to the rigidity contributable portion.

Figure 12:
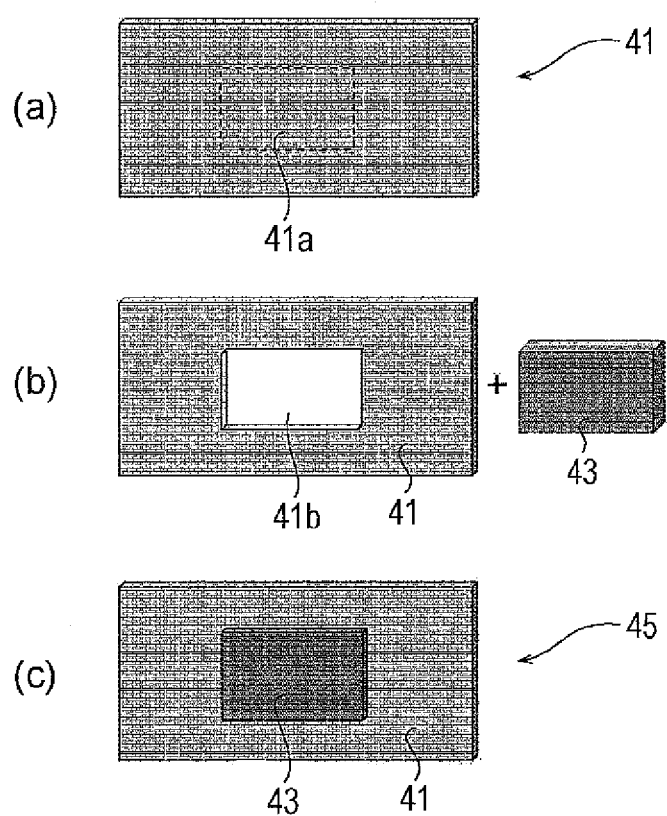
FIG. 12 is a diagram illustrating a specific example of a method for improving the rigidity in the rigidity improving step in the method for reducing springback illustrated in FIG. 1.
Figure 13:
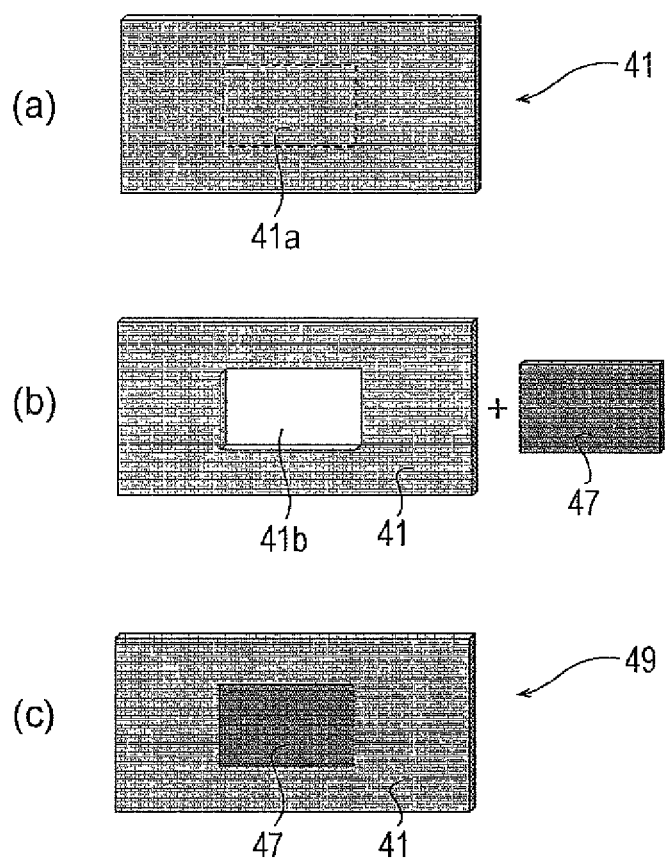
FIG. 13 is a diagram illustrating another example of the method for improving the rigidity illustrated in FIG. 12.
Figure 14:
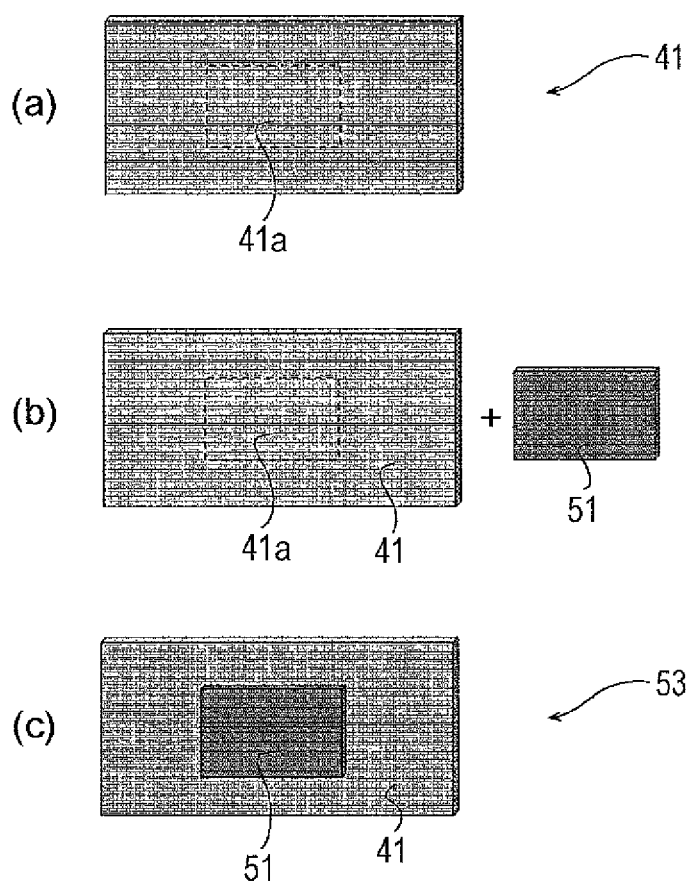
FIG. 14 is a diagram illustrating another example of the method for improving the rigidity, different from the examples illustrated in FIGS. 12 and 13.

Referring now to FIG. 12 to FIG. 14, cases where the rigidity of the rigidity contributable portion 41a of a blank sheet 41 of a certain part is improved by these methods are described.

In the method of increasing the thickness of the rigidity contributable portion, for example, the rigidity contributable portion 41a of the blank sheet 41 (see FIG. 12(a)) is blanked to form a blanked hole 41b. A sheet member 43 formed from a thicker sheet and having the same shape as the rigidity contributable portion 41a is fitted into the blanked hole 41b (see FIG. 12(b)) and joined to the blank sheet 41 by laser welding or by other means to form a so-called tailored blank sheet 45 (see FIG. 12(c)). When the tailored blank sheet 45 thus formed is subjected to press forming, the rigidity contributable portion 41a of the press-formed part can have a large thickness, whereby the rigidity of the rigidity contributable portion 41a can be improved.

In the method of increasing the Young's modulus of the rigidity contributable portion 41a of the blank sheet 41, for example, the rigidity contributable portion 41a of the blank sheet 41 (see FIG. 13(a)) is blanked to form a blanked hole 41b, in the same manner as in the case of increasing the thickness. A sheet member 47 having a higher Young's modulus and the same shape as the rigidity contributable portion 41a is fitted into the blanked hole 41b (see FIG. 13(b)) and joined to the blank sheet 41 by laser welding or by other means to form a tailored blank sheet 49 (see FIG. 13(c)). When the tailored blank sheet 49 thus formed is subjected to press forming, the rigidity contributable portion 41a of the press-formed part can have a higher Young's modulus, whereby the rigidity of the rigidity contributable portion 41a can be improved.

In the method of bonding another sheet to the rigidity contributable portion 41a of the blank sheet 41, a sheet member 51 of another sheet material formed into the same shape as the rigidity contributable portion 41a is joined by welding or bonded with adhesive (see FIG. 14(b)) to the rigidity contributable portion 41a of the blank sheet 41 (see FIG. 14(a)) to form a reinforced blank sheet 53 (see FIG. 14(c)). When the reinforced blank sheet 53 thus formed is subjected to press forming, a press-formed part having a rigidity contributable portion 41a that is reinforced and has a high rigidity can be obtained.

The method for improving the rigidity of the rigidity contributable portion 41a of the blank sheet 41 may be a combination of appropriately selected ones of the above examples. For example, a sheet member having a large thickness and a higher Young's modulus may be bonded to the rigidity contributable portion 41a. Furthermore, the blank sheet (the tailored blank sheet or the reinforced blank sheet) thus formed may be press formed using a die for shaping the rigidity contributable portion 41a into a protruding shape and/or a recessed shape.

Referring to FIG. 15 to FIG. 22, examples of the methods for improving the rigidity of a specific portion of the blank sheet (the method for increasing the thickness, the method for increasing the Young's modulus, or the method for bonding another sheet) is performed on the A pillar 21 is described.

Firstly, analytic models 23 of the A pillar 21 are formed with both plane elements and solid elements, and the analytic model 23 is subjected to an optimization analysis for shape with consideration of the bending-torsional-combined deformation (bending-torsional-combined load).

Figure 15:
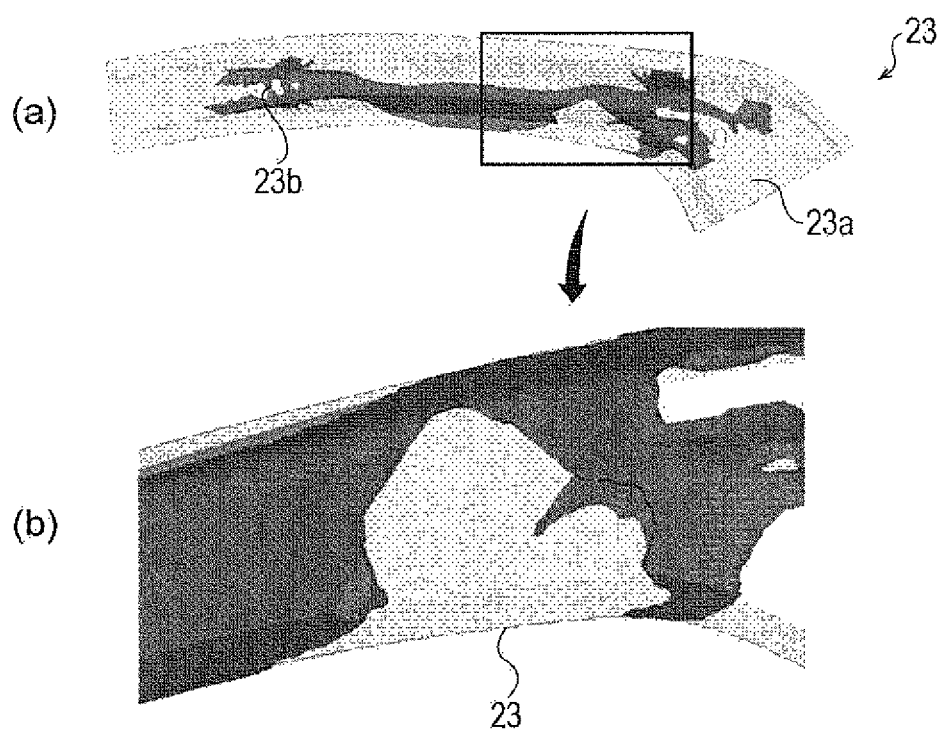
FIG. 15 is a diagram illustrating a result obtained after performing, on an A pillar, a rigidity-contributable-portion detecting step for illustration of the method for improving the rigidity illustrated in FIG. 12.

FIG. 15 illustrates a result of an optimization analysis for shape. FIG. 15(a) is a plan view of the analytic model 23 after performing the rigidity-contributable-portion detecting step S5 (the same as the one illustrated in FIG. 9(c)) and FIG. 15(b) illustrates a portion surrounded by a square of FIG. 15(a) in an enlarged manner in a perspective view as in the case of FIG. 3(b). The rigidity contributable portion is marked with thick grey.

Figure 16:
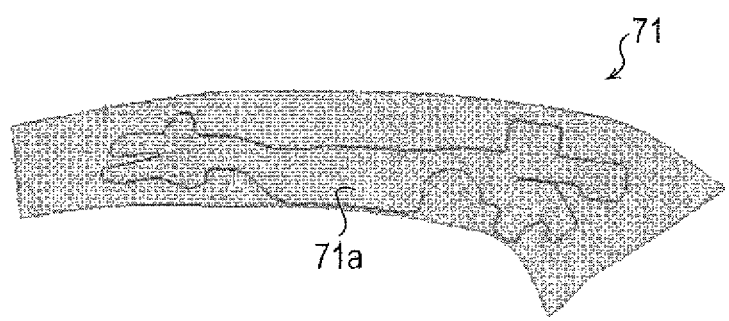
FIG. 16 is a diagram illustrating an example of a method for improving the rigidity on the basis of the result obtained after performing the rigidity-contributable-portion detecting step illustrated in FIG. 15 (part 1).
Figure 17:
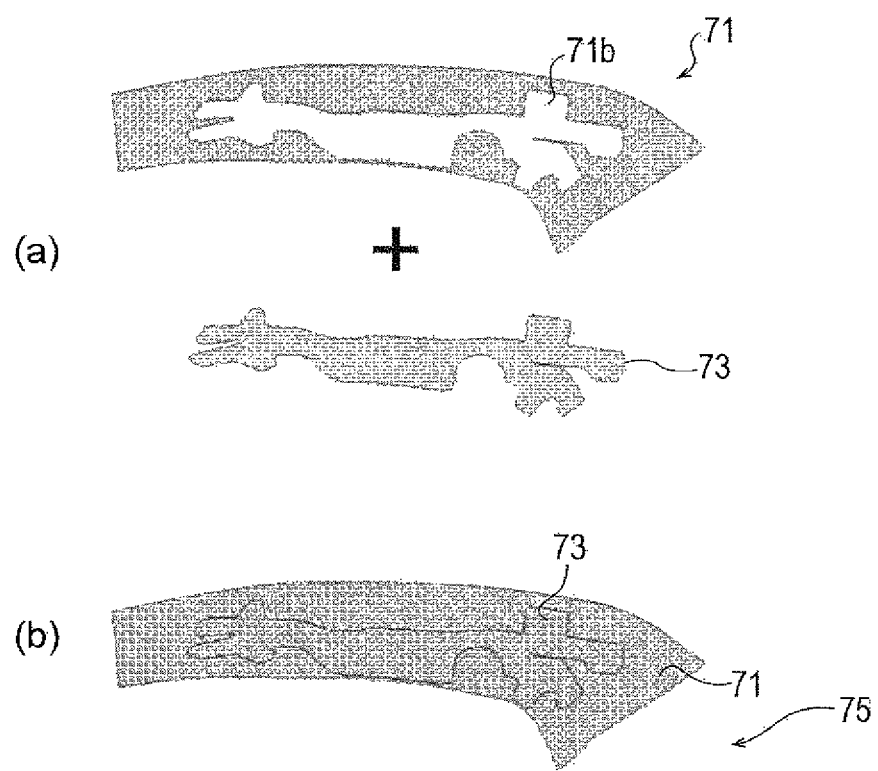
FIG. 17 is a diagram illustrating an example of a method for improving the rigidity on the basis of the result obtained after performing the rigidity-contributable-portion detecting step illustrated in FIG. 15 (part 2).

FIG. 16 illustrates the state of the analytic model 23 subjected to the analysis of reverse press forming and opened in a flat state (blank sheet 71). A portion surrounded by a line in the blank sheet 71 is a rigidity contributable portion 71a of the blank sheet 71. The shape of the rigidity contributable portion 71a of the blank sheet 71 corresponds to the outline shape of the rigidity contributable portion of the analytic model 23. The thickness of the blank sheet 71 is 1.4 mm.

The following describes examples that the rigidity contributable portion 71a of the blank sheet 71 thus formed is improved by increasing the thickness, increasing the Young's modulus, and by bonding another sheet.

In the case of increasing the thickness, the rigidity contributable portion 71a of the blank sheet 71 is blanked as illustrated in FIG. 17(a), whereby a blanked hole 71b is formed. A sheet member 73 having the same shape as the rigidity contributable portion 71a and a thickness of two times the thickness of the blank sheet 71 (1.4 mm×2=2.8 mm) is fitted into the blanked hole 71b and welded to the blank sheet 71 to form a tailored blank sheet 75 (see FIG. 17(b)).

Figure 18:
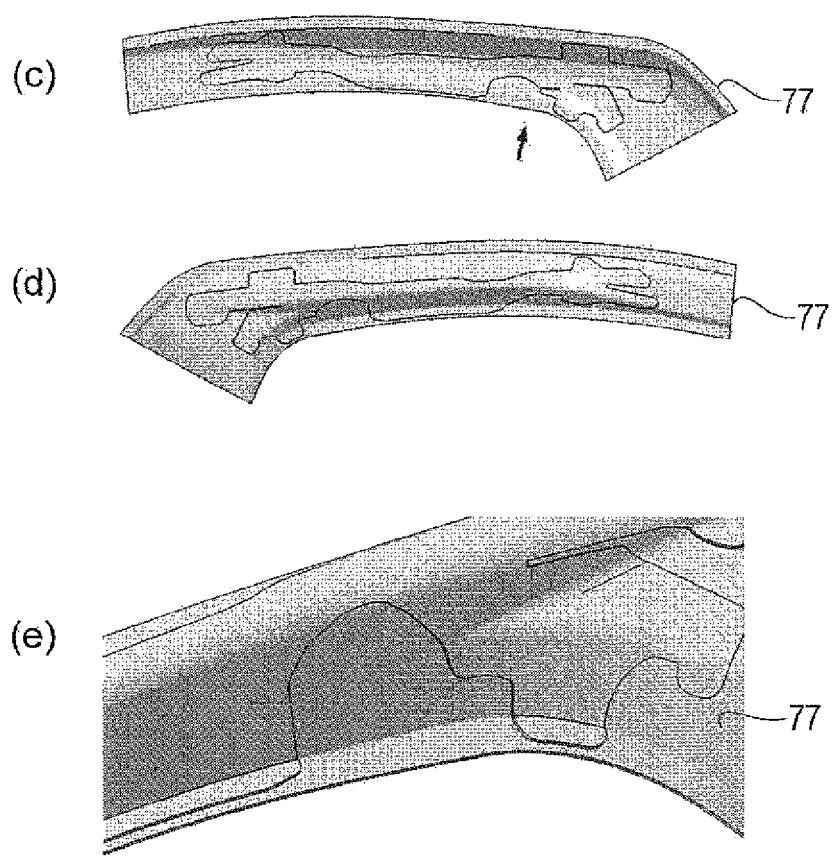
FIG. 18 is a diagram illustrating an example of a method for improving the rigidity on the basis of the result obtained after performing the rigidity-contributable-portion detecting step illustrated in FIG. 15 (part 3).
Figure 19:
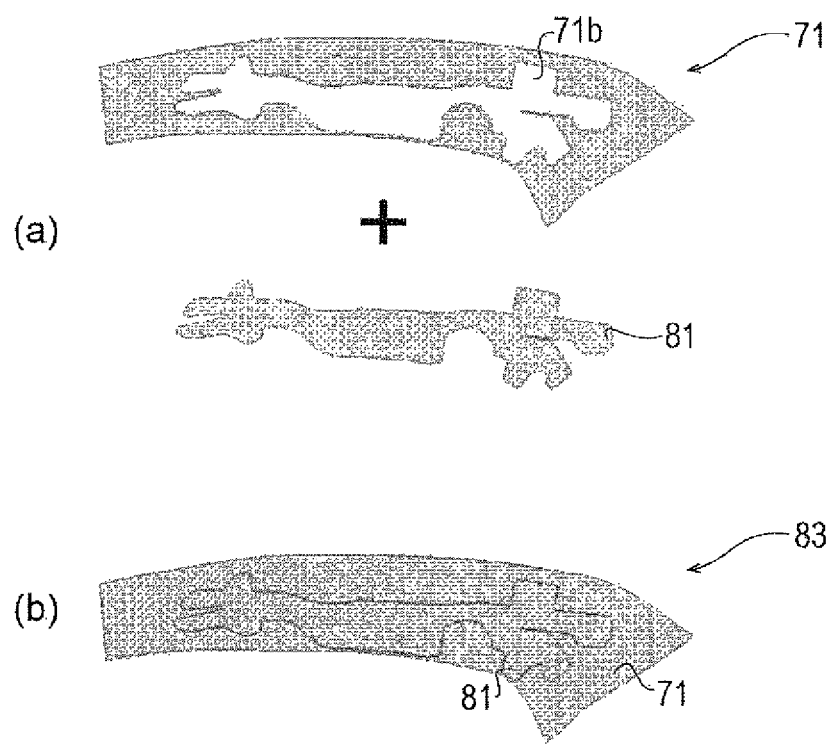
FIG. 19 is a diagram illustrating an example of a method for improving the rigidity on the basis of the result obtained after performing the rigidity-contributable-portion detecting step illustrated in FIG. 15 (part 4).

FIG. 18 illustrates a press-formed part 77 formed by press forming the tailored blank sheet 75 thus formed. FIG. 18(c) is a plan view of the press-formed part 77, FIG. 18(d) is a bottom view of the press-formed part 77, and FIG. 18(e) is a perspective view of the press-formed part 77 viewed in a direction of an arrow illustrated in FIG. 18(c). As illustrated in FIG. 18(e), the press-formed part 77 has a stepped portion due to there being a difference between the thickness of the blank sheet 71 and that of the sheet member 73 along the outline shape of the rigidity contributable portion 71a.

In the case of increasing the Young's modulus, as illustrated in FIG. 19(a), a sheet member 81, which has the same shape as the rigidity contributable portion 71a, the same thickness as the blank sheet 71, and a higher Young's modulus, is fitted into the blanked hole 71b of the blank sheet 71 and welded to the blank sheet 71 to form a tailored blank sheet 83 (see FIG. 19(b)).

Figure 20:
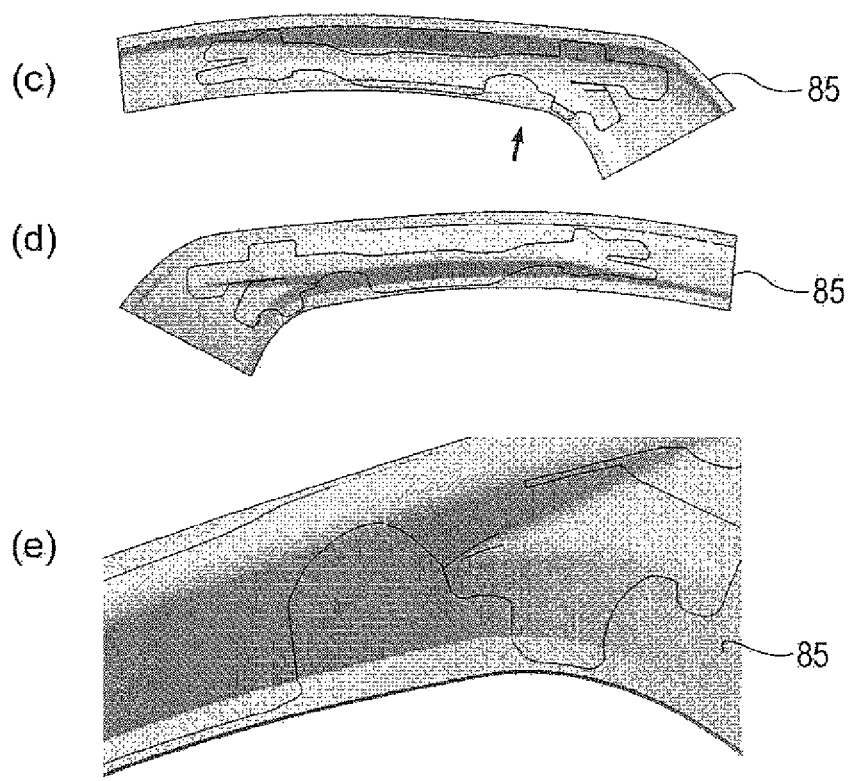
FIG. 20 is a diagram illustrating an example of a method for improving the rigidity on the basis of the result obtained after performing the rigidity-contributable-portion detecting step illustrated in FIG. 15 (part 5).
Figure 21:
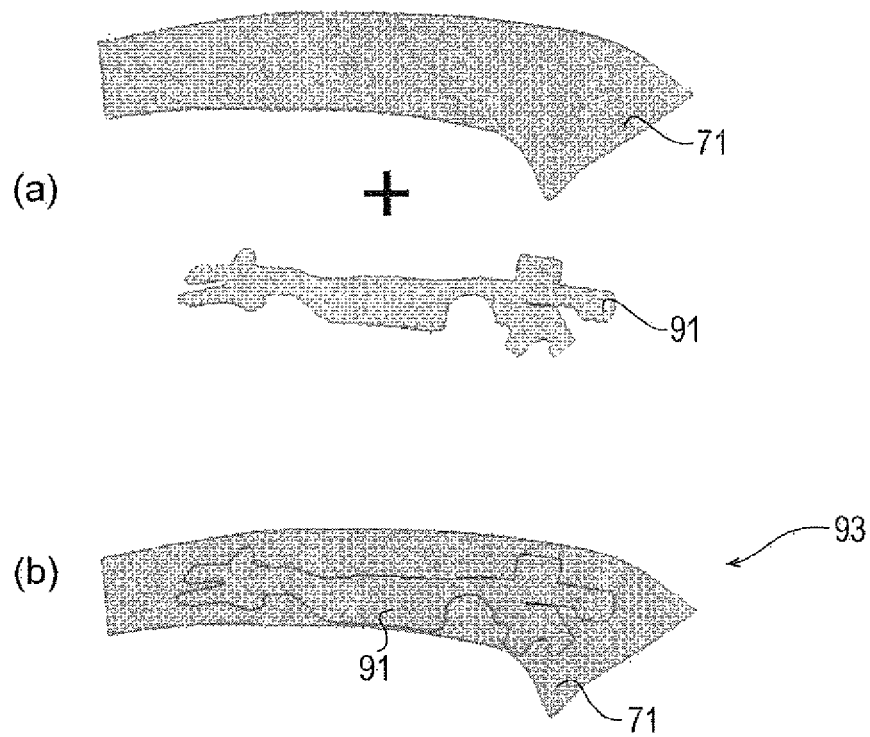
FIG. 21 is a diagram illustrating an example of a method for improving the rigidity on the basis of the result obtained after performing the rigidity-contributable-portion detecting step illustrated in FIG. 15 (part 6).

FIG. 20 illustrates a press-formed part 85 formed by press forming the tailored blank sheet 83 thus formed. FIG. 20(c) is a plan view of the press-formed part 85, FIG. 20(d) is a bottom view of the press-formed part 85, and FIG. 20(e) is a perspective view of the press-formed part 85 viewed in a direction of an arrow illustrated in FIG. 20(c). As illustrated in FIG. 20(e), the press-formed part 85 does not have a stepped portion like the one seen in FIG. 18(e) because the blank sheet 71 and the sheet member 81 have the same thickness.

In the case of bonding another sheet, as illustrated in FIG. 21(a), a sheet member 91 having the same shape as the rigidity contributable portion 71a of the blank sheet 71, the same thickness as the blank sheet 71, and the same Young's modulus as the blank sheet 71 is bonded to the rigidity contributable portion 71a to form a reinforced blank sheet 93 (see FIG. 21(b)).

Figure 22:
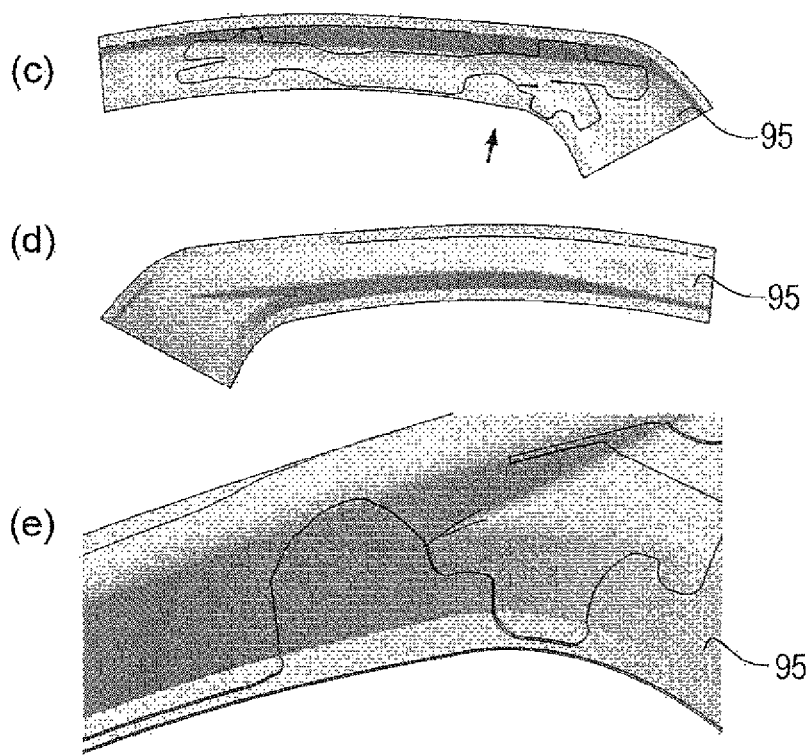
FIG. 22 is a diagram illustrating an example of a method for improving the rigidity on the basis of the result obtained after performing the rigidity-contributable-portion detecting step illustrated in FIG. 15 (part 7).

FIG. 22 illustrates a press-formed part 95 formed by press forming the reinforced blank sheet 93 thus formed. FIG. 22(c) is a plan view of the press-formed part 95, FIG. 22(d) is a bottom view of the press-formed part 95, and FIG. 22(e) is a perspective view of the press-formed part 95 viewed in a direction of an arrow illustrated in FIG. 22(c). As illustrated in FIG. 22(e), the press-formed part 95 has a stepped portion due to the sheet member 91 being bonded to the blank sheet 71.

Example 1

Effects of the method for reducing springback according to the present invention will be described with reference to specific examples.

In the above embodiment, a case where the thickness of a portion of the analytic model 23 of the A pillar 21 is increased on the basis of the rigidity contributable portion detected in the rigidity-contributable-portion detecting step S55 is described as an example of the rigidity improvement method. In this example, on the other hand, a case where the rigidity is improved by shaping a portion of the A pillar 21 into a recessed shape on the basis of the detected rigidity contributable portion of the analytic model 23 will be described.

Figure 23:
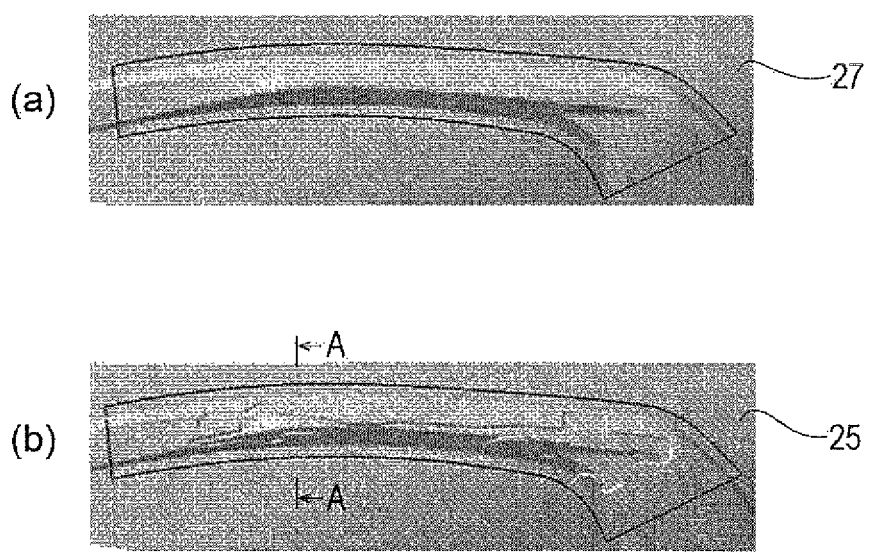
FIG. 23 is a diagram illustrating the springback reduction method according to Example 1 of the present invention.

A shape that roughly follows the outline shape of the rigidity contributable portion was used as a recessed shape. FIG. 23(a) illustrates a die 27 before forming a portion into a recessed shape while FIG. 23(a) illustrates a die 25 after forming a portion into a recessed shape.

Figure 24:
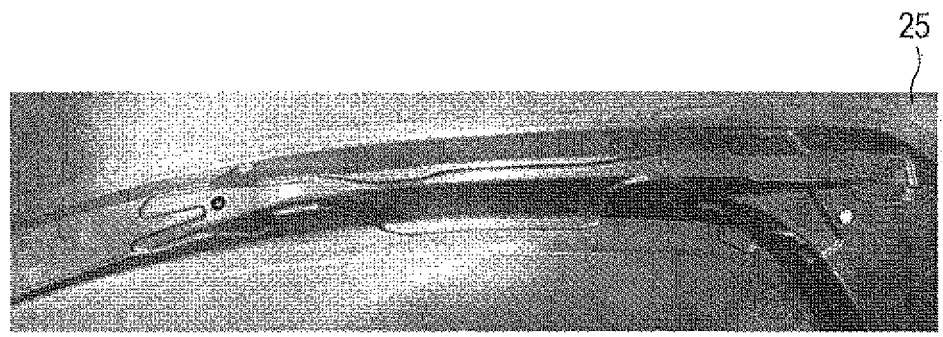
FIG. 24 illustrates a die fabricated for confirming the effect of the springback reduction method illustrated in FIG. 23.
Figure 25:
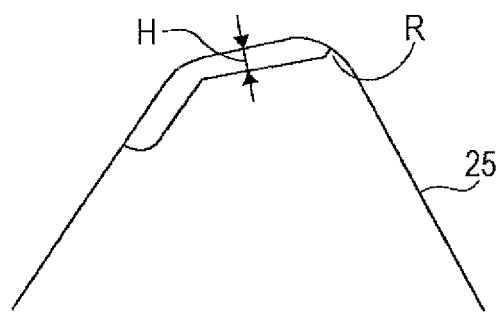
FIG. 25 is a diagram illustrating the die illustrated in FIG. 24 and including a cross section taken along the line A-A of FIG. 23.

In Example 1, a press-formed part 29 (FIG. 26) was formed by press forming using an actually fabricated die 25 illustrated in FIG. 23(b) (and FIG. 24) for forming the A pillar 21 by a press forming. The depth H of the recess of the die 25 and the shape of the edge of the recess were determined such that the springback reduction effect becomes the maximum within a range that cracks do not occur. Specifically, the depth H of the recess was uniformly set to 4 mm and the shape of the edge of the recess was set such that a radius R=3 mm (see FIG. 25).

Figure 26:
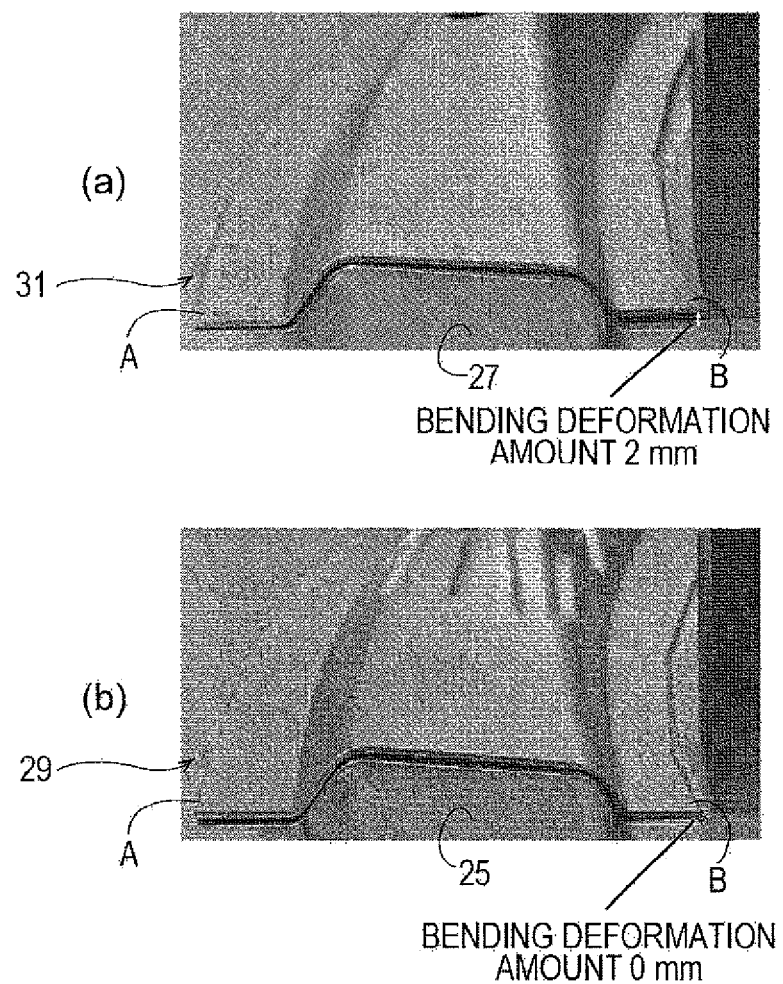
FIG. 26 is a diagram illustrating results obtained after performing the springback reduction method as illustrated in FIG. 23 (part 1).
Figure 27:
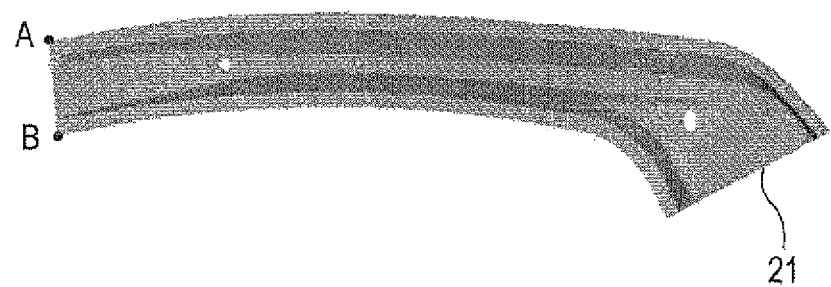
FIG. 27 is a diagram illustrating a method for evaluating the results obtained after performing the springback reduction method as illustrated in FIG. 23.

FIG. 26 illustrates the results obtained after an actual press forming. A steel sheet having strength of 440 MPa and a thickness of 1.4 mm was used as a base material. FIG. 26 illustrates the state where a press-formed part overlaps the die 25 to show the resultant springback. Specifically, FIG. 26 illustrates the state where an end portion of the A pillar 21 illustrated on the left of FIG. 3(a) is viewed from the left of the A pillar 21. FIG. 26(a) illustrates a press-formed part 31 (Comparative Example 3) formed by performing press forming using the die 27 without the measure against springback taken, for comparison. FIG. 26(b) illustrates a press-formed part 29 (Invention Example 2) formed using the die 25 with the measure against the springback. As illustrated in FIG. 27, an upper corner of the end portion is provisionally taken as a corner A and a lower corner of the end portion is provisionally taken as a corner B. In the press-formed part 31 (Comparative Example 3) formed using the lower die 27 without the measure against the springback, the corner B was 2 mm apart from the die 27 as indicated by the arrow in FIG. 26(a) (bending deformation amount was 2 mm). On the other hand, in the press-formed part 29 (Invention Example 2), the corner B was in contact with the die 25 as illustrated in FIG. 26(b) and the bending deformation did not occur in the corner B.

Figure 28:
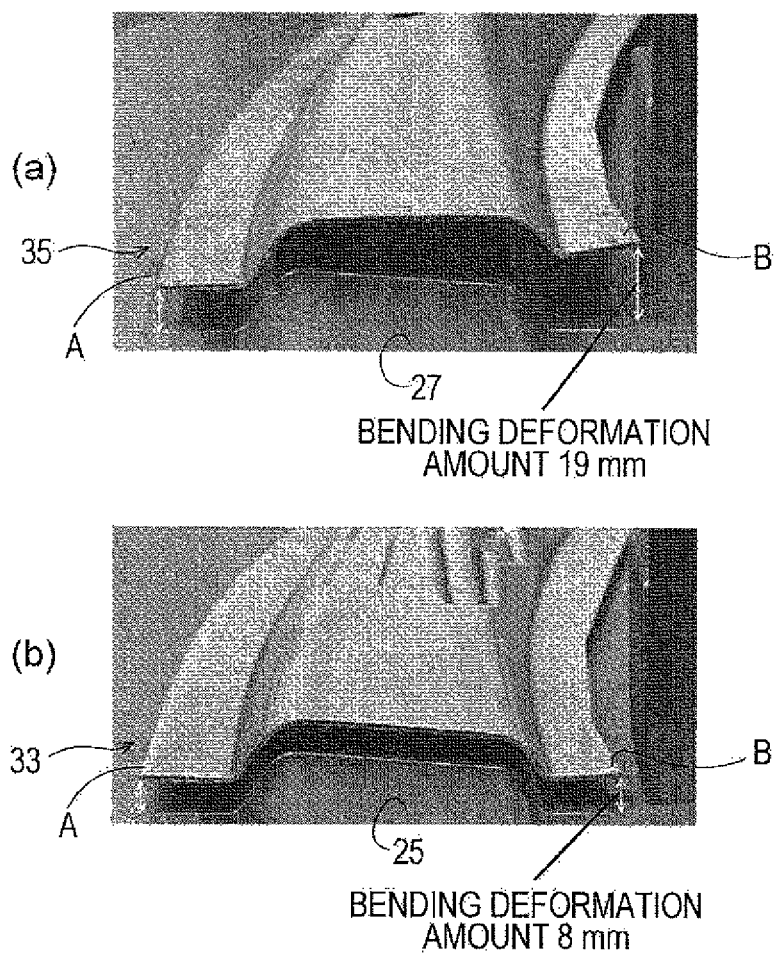
FIG. 28 is a diagram illustrating results obtained after performing the springback reduction method illustrated in FIG. 23 (part 2).

FIG. 28 illustrates the results obtained after actually performing press forming on a base material, which is a high strength steel sheet having strength of 980 MPa (thickness 1.4 mm), using two types of dies (the die 25 and the die 27). FIG. 28(a) illustrates a press-formed part 35 (Comparative Example 4) formed using the die 27. FIG. 28(b) illustrates a press-formed part 33 (Invention Example 3) formed using the die 25. As in the case of FIG. 26, FIG. 28 illustrates the state where the press-formed part (the press-formed part 33 or the press-formed part 35) overlaps the die (the die 25 or the die 27) viewed from the point similar to that in the case of FIG. 26.

As illustrated in FIG. 28(a), in the press-formed part 35 (Comparative Example 4), both the corner A and the corner B undergo bending deformation and thus are apart from the die 27 to a large degree. The corner B, in particular, has an amount of bending deformation of 19 mm. In addition, as indicated by the arrows in FIG. 28(a), the amount of bending deformation in the corner A and the amount of bending deformation in the corner B are not uniform with each other. This fact shows that the torsional deformation has also occurred. On the other hand, in the press-formed part 33 (Invention Example 3), the corner B is apart from the die 25 as illustrated in FIG. 28(b), but the amount by which it is apart (bending deformation amount) is 8 mm, which is small. This result shows that the bending deformation is reduced to a larger degree compared with the case of Comparative Example 4. In addition, as indicated by the arrows illustrated in FIG. 28(b), the amount of bending deformation in the corner A and the amount of bending deformation in the corner B are substantially the same. This fact shows that the torsional deformation did not occur.

A computer aided engineering (CAE) analysis of springback was performed on Comparative Example 4 and Invention Example 3. Table 2 collectively lists the results of amounts of bending deformation and amounts of torsional deformation at the corners A and the corners B of Comparative Example 4 and Invention Example 3 from the die (the die 25 and the die 27). The amount of torsional deformation represents how much the corner B is bent with reference to the corner A and is calculated by subtracting the amount of bending deformation at the corner A from the amount of bending deformation at the corner B. If the amount of torsional deformation is close to zero, it means that the torsional deformation is small.

TABLE 2

|  | Bending Deformation Amount at Corner A (mm) | Bending Deformation Amount at Corner B (mm) | Torsional Deformation Amount (mm) |
|---|---|---|---|
| Comparative Example 4 | 1.2 | 11.7 | 10.5 |
| Inventive Example 3 | 4.0 | 4.0 | 0.0 |

As illustrated in Table 2, the results of CAE analysis also show that the bending deformation at the corner B in Invention Example 3 is improved compared to that of Comparative Example 4. In addition, the torsional deformation did not occur in Invention Example 3. That is, the results of the CAE analysis is consistent with the experimental results obtained from an actual press forming. This means that the method for reducing springback according to the present invention ensures that the CAE analysis provides correct results similar to the results obtained from actual press forming with.

Example 2

Example 1 shows results of comparison between the case where the analytic models 23 of the A pillar 21 have a recessed shape as illustrated in FIG. 23(b) as an example of the rigidity improvement method (Invention Example 2 and Invention Example 3) and the case where the rigidity improvement method is not performed on the analytic models 23, as illustrated in FIG. 23(a) (Comparative Example 3 and Comparative Example 4).

In this example, in order to confirm that a portion detected in the rigidity-contributable-portion detecting step is appropriate, results of cases where the rigidity improvement method is performed on the basis of a human intuition will be described for comparison.

The rigidity improvement method according to the invention was performed such that a recessed portion is formed in a part as in the case of Example 1 (Invention Example 4). Two types of the rigidity improvement method based on the intuition were performed such that a straight recessed portion is formed in a ceiling portion 23a of the analytic model 23 (Comparative Example 5) as illustrated in FIG. 29(a) and such that six recessed portions (Comparative Example 6), formed by dividing the recessed portion illustrated in FIG. 29(a) into six, are arranged along the longitudinal direction, as illustrated in FIG. 29(b).

Figure 30:
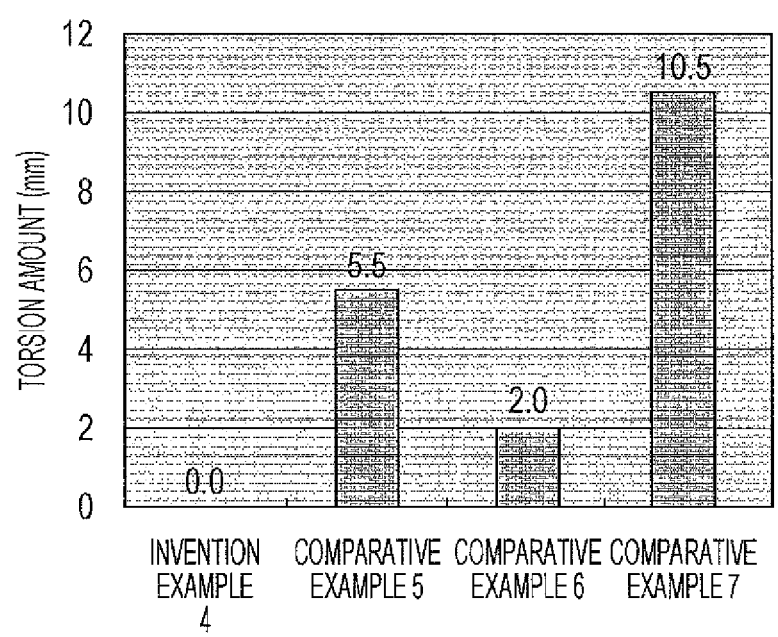
FIG. 30 is a diagram illustrating an effect of the springback reduction method according to Example 2 of the present invention.

FIG. 30 illustrates the results of CAE analysis of springback of Invention Example 4, Comparative Example 5, and Comparative Example 6. FIG. 30 is a graph of the amount of torsional deformation on the basis of the Z direction displacement of the corner A and the corner B for each of Invention Example 4, Comparative Example 5, and Comparative Example 6. FIG. 30 also shows the CAE results of Comparative Example 7 on which the rigidity improvement method is not performed for comparison.

As illustrated in FIG. 30, the amount of torsional deformation in Comparative Example 7 on which the method was not performed was 10.5 am, whereas the amount of torsional deformation in Comparative Example 5 on which the method was performed was 5.5 mm and the amount of torsional deformation in Comparative Example 6 on which the method was performed was 2.0 mm. Although the amounts of torsional deformation were lower than that in Comparative Example 7, torsional deformation occurred in Comparative Examples 5 and 6. On the other hand, it is found that the torsional deformation did not occur in Invention Example 4, which resulted excellently.

As described above, it was confirmed that the method for reducing springback according to the present invention allows effective reduction of the springback by detecting a rigidity contributable portion of a part and increasing the rigidity of the part on the basis of the rigidity contributable portion.

REFERENCE SIGNS LIST 1 springback reducing apparatus
3 display device
5 input device
7 main storage device
9 auxiliary storage device
11 processing unit
13 analytic model forming means
15 stressed-state setting means
17 rigidity-contributable-portion detecting means
19 rigidity improving means
21 A pillar
23 analytic model
23a ceiling portion
23b punched hole
25, 27 die 29, 31, 33, 35 press-formed part
41 blank sheet
41a rigidity contributable portion
41b blanked hole
43 sheet member
45 tailored blank sheet
47 sheet member
49 tailored blank sheet
51 sheet member
53 reinforced blank sheet
71 blank sheet
71a rigidity contributable portion
71b blanked hole
73 sheet member
75 tailored blank sheet
77 press-formed part
81 sheet member
83 tailored blank sheet
85 press-formed part
91 sheet member
93 reinforced blank sheet
95 press-formed part

The invention claimed is:

1. A method for reducing a springback that occurs in a part formed by press forming a metal sheet, the method comprising:
an analytic model forming step including forming an analytic model of the part with elements, the elements including at least one of plane elements and solid elements;
a stressed-state setting step including setting each of the elements of the analytic model to a stressed state that causes a springback;
a rigidity-contributable-portion detecting step including performing an optimization analysis on the analytic model with the elements set to the stressed state and detecting a portion of the part that contributes to the rigidity of the part; and
a rigidity improving step including applying a rigidity improving unit to the part on a basis of the portion detected in the rigidity-contributable-portion detecting step,
wherein the optimization analysis includes analyzing an analytic model of a target part to leave minimum elements required for satisfying given analytic conditions and determining a portion including only the minimum elements as an optimal portion.

2. The method for reducing the springback according to claim 1, wherein the stressed-state setting step includes constraining a first portion of the analytic model and applying at least one of a bending load and a torsional load to a second portion of the analytic model to generate stress in the analytic model so that each of the elements of the analytic model is set to the stressed state.

3. The method for reducing the springback according to claim 2, wherein the stressed-state setting step includes setting a springback evaluation point as a constraint point at which the analytic model is constrained.

4. The method for reducing the springback according to claim 2, wherein the stressed-state setting step includes setting a direction in which the springback occurs in an additional part formed in advance as a direction in which the at least one of the bending load and the torsional load is applied to the second portion of the analytic model.

5. The method for reducing the springback according to claim 1, wherein the stressed-state setting step includes performing a forming analysis on the analytic model to determine residual stress generated in the part before a separation from a die and setting the determined residual stress to each of the elements of the analytic model.

6. The method for reducing the springback according to claim 1, wherein the rigidity improving unit performs, on the basis of the portion of the part detected in the rigidity-contributable-portion detecting step, at least one of increasing a thickness, increasing a Young's modulus, bonding another sheet, forming a protruding shape and forming a recessed shape.

7. A springback-reduction analyzing apparatus that reduces a springback that occurs in a part formed by press forming a metal sheet, the apparatus comprising a display device, an input device, a main storage device, an auxiliary storage device, and a processing unit, the devices being connected to the processing unit, and the processing unit configured to serve at least as:
an analytic model forming unit configured to form an analytic model of the part with elements, the elements including at least one of plane elements and solid elements;
a stressed-state setting unit configured to set each of the elements of the analytic model to a stressed state that causes the springback;
a rigidity-contributable-portion detecting unit configured to perform an optimization analysis on the analytic model with the elements set in the stressed state to detect a portion of the part that highly contributes to the rigidity of the part; and
a rigidity improving unit configured to apply a rigidity improvement unit to the part on a basis of the portion detected by the rigidity-contributable-portion detecting unit,
wherein the optimization analysis includes analyzing an analytic model of a target part to leave minimum elements required for satisfying given analytic conditions and determining a portion including only the minimum elements as an optimal portion.

8. The analyzing apparatus according to claim 7, wherein the stressed-state setting unit is configured to set a first portion of the analytic model and to apply at least one of a bending load and a torsional load to a second portion of the analytic model to generate stress in the analytic model so that each of the elements of the analytic model is set to the stressed state.

9. The analyzing apparatus according to claim 8, wherein the stressed-state setting unit is configured to set a springback evaluation point as a constraint point at which the analytic model is constrained.

10. The analyzing apparatus according to claim 8, wherein the stressed-state setting unit is configured to set a direction in which the springback occurs in an additional part formed in advance as a direction in which the at least one of the bending load and the torsional load is applied to the second portion of the analytic model.

11. The analyzing apparatus according to claim 7, wherein the stressed-state setting unit is configured to perform a forming analysis on the analytic model to determine residual stress generated in the part before a separation from a die and to set the determined residual stress to each of the elements of the analytic model.

12. The analyzing apparatus according to claim 7, wherein the rigidity improving unit is configured to perform, on the basis of the portion of the analytic model detected in the rigidity-contributable-portion detecting step, at least one of increasing a thickness, increasing a Young's modulus, bonding another sheet, forming a protruding shape and forming a recessed shape.

\* \* \* \* \*